United States Patent [19]

Brydon

[11] 4,035,465

[45] July 12, 1977

[54] DRAWING POLYOXADIAZOLES FILAMENTS

[75] Inventor: Donald Lithgow Brydon, Harrogate, England

[73] Assignee: Imperial Chemical Industries Limited, London, England

[21] Appl. No.: 610,843

[22] Filed: Sept. 5, 1975

[30] Foreign Application Priority Data

Sept. 17, 1974 United Kingdom ............ 40421/74
Sept. 17, 1974 United Kingdom ............ 40422/74
Dec. 11, 1974 United Kingdom ............ 53544/74

[51] Int. Cl.$^2$ .......................................... D01D 5/12
[52] U.S. Cl. ....................... 264/210 F; 260/78.41; 264/184; 264/290 R
[58] Field of Search ................. 260/78.4 R, 78.41; 264/184, 210 F, 290 N, 290 R

[56] References Cited

U.S. PATENT DOCUMENTS

| 3,414,645 | 12/1968 | Morgan | 264/184 |
| 3,775,382 | 11/1973 | Brydon | 260/78.4 R |
| 3,796,693 | 3/1974 | Morgan et al. | 260/78 R |
| 3,869,429 | 3/1975 | Blades | 264/184 |
| 3,886,251 | 5/1975 | Sekiguchi et al. | 264/184 |
| 3,944,522 | 3/1976 | Tohyama et al. | 264/184 |

*Primary Examiner*—Jay H. Woo
*Attorney, Agent, or Firm*—Cushman, Darby & Cushman

[57] ABSTRACT

A method of making a drawn filament from a hot drawable poly-phenylene-1,3,4-oxadiazole having p-phenylene radicals or p-and m-phenylene radicals, with substituted bromine, wherein a solution of the polymer is dry jet wet spun into a coagulant, the filament washed and dried, and drawn at a temperature of at least 350° C at a draw ratio of at least 6:1.

10 Claims, No Drawings

DRAWING POLYOXADIAZOLES FILAMENTS

The present invention relates to a method for the production of a drawn filament of poly-phenylene-1,3,4-oxadiazole.

Filaments of poly-phenylene-1,3,4-oxadiazole are known. They are very heat stable and have been considered as being suitable for high performance end uses, e.g. tyre cords, if it were possible to make them with sufficiently good properties. The drawing of this type of filament has been described. One method which has been described consists in drawing the filament in hot water from 2 to 7 times its length, but the resulting mechanical properties were low. High values of mechanical properties have been claimed, but the method used relied on the use of a very toxic and expensive coagulant in the spinning method, an initial drawing in hot water at a draw ratio 2:1 to 3:1 and a secondary drawing in an inert gas at 300° C. to 400° C. at a draw ratio of 1:1 to 1.8:1. Thus, until now it has not proved possible to produce a drawn filament of poly-phenylene-1,3,4-oxadiazole by hot drawing at high temperatures and high draw ratios.

Accordingly, the present invention provides a method for the production of a drawn filament of poly-phenylene-1,3,4-oxadiazole, which comprises extruding through a shaped orifice a solution of the polymer in oleum or sulphuric acid, the polymer having as characteristic units

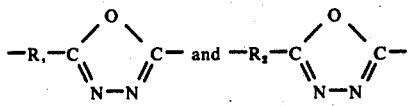

in which $R_1$ is a p-phenylene radical and $R_2$ is a m-phenylene radical, the ratio of $R_1$ radicals to $R_2$ radicals is in the range 100/0 to 10/90, and at least some of the $R_1$ and/or $R_2$ radicals are bromine substituted in a position ortho to the heterocyclic ring, passing the extruded polymer solution through a gaseous medium for a short distance and then into an aqueous coagulant which forms the filament of the polymer, withdrawing the resultant filament from the aqueous coagulant, washing the filament, drying the filament, and heating the filament to a temperature of at least 350° C. while subjecting it to drawing at a draw ratio of at least 6:1.

Preferably, the filament is heated to a temperature of at least 400° C. during drawing, which temperature is below the thermal decomposition temperature of the polymer. In addition to the drawing treatment the filament may, if desired, be subjected to spin stretch i.e. stretching in the aqueous coagulant by making the rate of withdrawal therefrom greater than the rate of extrusion from the shaped orifice by up to 3.5 times. In combination with, or alternatively to, the spin stretch the filament may be wet stretched during washing in hot water (e.g. 60° C. to 90° C.) by up to 2.5 times. Stretching of the filament may also take place after drying and prior to drawing. The amount of stretch is minimal and may amount to a heat treatment of substantially constant length.

The filament is dried following washing, by passing it for example through a blanket of hot air or over a heated roll. Preferably, the drying of the filament immediately precedes the drawing thereof, and the preferred drying process in this case consists of passing the filament over and in contact with a heated surface at a temperature in the range 140° C. to 300° C., preferably 210° C. to 270° C. Conveniently, the heated surface is constituted by the peripheral surface of a roll about which the filament is wrapped, and this roll may be the feed roll of the drawing stage. The filament may be heated to the drawing temperature by passing it over and in contact with a hot plate positioned between the feed roll and the draw roll of the drawing stage.

The polymer solution is conveniently heated prior to and during extrusion. A temperature in the range 70° C. to 225° C. for the polymer solution may be used, preferably a temperature 80° C. to 200° C. The temperature selected is that which provides for a suitable solution viscosity for a given polymer concentration in the solution, and at which, for the extrusion conditions being used, does not produce the undesirable "Tordella" effect [J. Appl. Phys. 27, 254, (1956)]. The polymer is extruded in solution in oleum directly, or the solution may be treated by the addition of water or steam, the latter being preferred, to reduce the concentration of the oleum to 100% sulphuric acid or less prior to extrusion.

The filament may be spun from a solution having a polymer concentration in the range 1% to 20% by weight, preferably 7% to 20% by weight. The polymer has an inherent viscosity greater than 1.0, and preferably greater than 2.0, as measured at 25° C. as a 0.5% solution in 98% sulphuric acid.

The polymer solution is spun to form a single filament or a plurality of filaments. The or each extrusion orifice is positioned above the aqueous coagulant, and the polymer solution is extruded downwardly by being forced through the or each orifice to form a stream of of the polymer solution which is passed through a gaseous medium, usually comprising air, for a short distance before it enters the aqueous coagulant. The distance travelled by the polymer stream through the gaseous medium is usually from 0.3 cm to 3.8 cms. and preferably is 1.0 cm. However, the optimum distance is readily ascertainable, and depends on viscosity, concentration, temperature and other spinning solution conditions.

The aqueous coagulant may be water, or most preferably, aqueous sulphuric acid, and its temperature may be varied as desired above and below ambient temperature (i.e. about 12° C.). Additives for physically and/or chemically modifying the properties of the filament, or the action of the aqueous coagulant, may be used in the coagulation bath. The extruded stream of polymer solution may be fed into a dynamic coagulant system, e.g. one wherein the coagulant flows through a tube and the stream of polymer solution passes through the tube in intimate contact with the coagulant. Additionally, or alternatively, the extruded stream of polymer solution may be fed into a static coagulant system, e.g. one wherein the coagulant is contained within a bath and through which the extruded stream of polymer solution is passed. The thus-formed filament is withdrawn from the aqueous coagulant and washed. Washing may be effected by passing the filament through one or more water baths, in which the water is heated, to remove solvent and coagulant.

The filament is formed of an oxadiazole polymer containing in the characterising units $R_1$ radicals only, or $R_1$ radicals and $R_2$ radicals, and in which the $R_1$ and/or the $R_2$ radicals have been bromine substituted In order for the filament to be hot drawable according to the invention it is necessary that at least some of the $R_1$ and/or $R_2$ radicals have the bromine substituted in a position which is ortho relative to the heterocyclic, i.e. oxadiazole, ring. Preferred polymers are based on terephthalic acid alone, or preferably on mixtures of terephthalic acid and isophthalic acid, which are polymerised with a hydrazine salt, especially hydrazine sulphate, in oleum of from 5% to 65% strength, preferably 20% to 40% strength. Bromination may be effected (by adding bromine to the polymer in solution in oleum, or) using brominated acid(s), or a mixture of brominated acids and unbrominated acids. The acids are, desirably, dissolved in the oleum before addition of the hydrazine derivative.

The preferred polymer using for making the filament of the invention has a ratio of $R_1$ radicals to $R_2$ radicals in the range 95/5 to 70/30, because in this range the drawn filament has extremely good mechanical properties. Most desirably, the bromine content of the polymer is at least 15% by weight.

The invention will be further described with reference to the following Examples, in which the temperature of maximum draw ratio and the maximum draw ratio was determined by experiment using different temperatures, at each of which the draw ratio was increased in steps of 0.5 until drawing was no longer possible, and in which parts are by weight unless otherwise indicated.

EXAMPLE 1

Terephthalic acid (166.2 parts) was dissolved in oleum (2320 parts) of 35% strength at 85° C. and then bromine (68.6 parts) was added dropwise over 4 hours to the stirred, heated solution which was protected from atmospheric moisture by a silica drying tube on top of a water condenser. After a further hour, when the bromine had reacted with the terephthalic acid in the heated stirred solution, the source of heat was removed and the reaction flask was flushed for a short time with compressed air to remove any residual traces of bromine.

Isophthalic acid (166.2 parts) and hydrazine sulphate (273.3 parts) were added to the solution of brominated terephthalic acid at room temperature and this reaction mixture was then heated for 4 hours at 130° C. with stirring to give a viscous solution.

The resultant polymer solution was diluted to a polymer concentration of 8% by weight with 100% sulphuric acid at 100° C., and the diluted solution was used as a spinning dope. Polymer isolated from the dope had a bromine content of 16% and an inherent viscosity of 2.38.

Following degassing the dope was dry-jet wet spun at 110° C. through a ten-hole spinneret (each hole being 200 $\mu$ diameter) with a one centimeter air gap into water at 12° C. and wound up with a spin stretch factor of 1.01. The spinning temperature was chosen to be 10° C. higher than the extrusion flow instability temperature. The spun filaments were washed free of sulphuric acid and dried. The inherent viscosity of the polymer of the filaments was 2.12.

The filaments were drawn between feed rolls and draw rolls while passing over and in contact with a grooved hot plate 46 cms. in length. The temperature of maximum draw ratio was found to be 430° C. and the maximum draw ratio was $18x$. At 430° C., with a feed speed of 6 meters/min. and a draw ratio of $18x$, the resulting draw filaments had the properties given in Table 1.

COMPARATIVE EXAMPLE A

In this example the bromine is substituted in the 5-position in the m-phenylene radicals only, i.e. not in a position ortho to the heterocyclic ring.

The bromination, polymerisation and spinning dope preparation were as described in Example 1, except that the isophthalic acid was dissolved in oleum and brominated, and the terephthalic acid, together with hydrazine sulphate, subsequently added. Polymer isolated from the spinning dope had a bromine content of 14.25% and an inherent viscosity of 2.14.

The spinning, washing and drying steps were as described in Example 1, except that the spinning temperature was 150° C. and the spin stretch factor was 0.99. The inherent viscosity of the polymer of the spun filaments was 2.14.

The filaments were drawn between feed rolls and draw rolls while passing over and in contact with a grooved hot plate 46 cms. in length. The temperature of maximum draw ratio was found to be 540° C. that the maximum draw ratio was $5x$. Drawing under these conditions, at a feed speed of 6 meters/min., the resulting drawn filaments had the properties given in Table 1.

EXAMPLE 2

An 8% by weight solution in 10% strength oleum of 15% brominated p-phenylene-1,3,4-oxiadiazole-m-phenylene-1,3,4-oxadiazole copolymer (of inherent viscosity 2.4), prepared by the reaction of equal amounts by weight of terephthalic acid and isophthalic acid with hydrazine sulphate in oleum and subsequent bromination of the resultant polymer solution, was degassed and dry-jet wet spun by the method according to Example 1 with a spin stretch factor of 1.0. The inherent viscosity of the polymer of the filaments was 2.3.

The filaments were drawn between feed rolls and draw rolls while passing over and in contact with a grooved hot-plate 46 cms in length. The temperature of maximum draw ratio was found to be 430° C. and the maximum draw ratio was $12x$. Drawing under these conditions, at a feed speed of 6 meters/min., the resulting draw filaments had the properties given in Table 1.

TABLE 1

| Example | 1 | A | 2 |
|---|---|---|---|
| Tenacity (g./decitex) | 9.75 | 2.38 | 7.5 |
| % Extension | 6 | 11.8 | 7 |
| Initial Modulus (g./decitex/100% Extension) | 240 | 70 | 180 |

EXAMPLE 3

A mixture of terephthalic acid (0.25 mole), isophthalic acid (0.09 mole), 2 bromo-isophthalic acid (0.16 mole), hydrazine sulphate (0.521 mole) and 30% oleum (529.7 parts) was stirred and heated to 130°–135° C. in 1.5 hours in a reaction vessel protected from atmospheric moisture. Stirring at 130° – 135° C. was continued for 3 hours and then 25% oleum (240 parts) was added gradually during the next 60 minutes and thereafter agitation at 130°– 135° C. was continued for a further 60 minutes. A viscous solution was obtained. Polymer isolated from the solution contained 14.3% bromine and had an inherent viscosity of 2.5.

The solution was degassed at 130° C. under 5 mm Hg pressure and dry jet wet spun at 5 ml/min using a 10 hole 200 u diameter spinneret at 165° C. through a 1 cm air gap into water at room temperature. The coagulated fibre was washed free of acid in water at 40° C., dried on a hot chrome roll and oiled to improve cohesiveness of the yarn bundle.

The dried yarn was passed at 10 m/min onto a 50 cm long hot plate at 400° C. and drawn at a M.D.R. of 7.

Table 2 lists the properties after spinning and hot drawing of this and other polyoxadiazoles which were prepared, spun and hot drawn by similar procedures to that given in Example 3.

unbrominated polymer and 195° C. for the brominated polymer. Drawing conditions were the same as Example 2 with the exception of hot plate temperature and draw ratio which are given below.

The properties of fibre obtained by spinning and hot drawing unbrominated polymer (Example B) and the brominated polymer (Example 6) were:

| Example | B | 6 |
|---|---|---|
| Tenacity (g/decitex) | 4.1 | 6.6 |
| Extension (%) | 4.3 | 2.6 |
| Initial modulus (g/decitex) | 162 | 272 |
| Maximum Draw Ratio | 3 | 6.5 |
| Drawing Temperature | 425 | 520 |

Other brominated polyoxadiazole dopes prepared by

TABLE 2

| Example | Ter-polyoxadiazole Composition (Molar Ratio) | IV | % Halogen | Spinning Temp ° C. | Hot Drawing Temp ° C. | Maximum Draw Ratio | Hot Drawn Fibre Properties T | E | M | IV |
|---|---|---|---|---|---|---|---|---|---|---|
| 3 | TA/2-Bromo-iPA/iPA (50/32/18) | 2.5 | 4.3 | 165 | 400 | 7 | 5.5 | 6.0 | 178 | 2.0 |
| 4 | TA/2-Bromo-TA/iPA (18/32/50) | 2.7 | 14.9 | 170 | 450 | 12 | 7.6 | 6.3 | 220 | 2.0 |
| 5 | TA/4-Bromo-iPA/iPA (50/32/18) | 1.9 | 14.3 | 150 | 435 | 10 | 6.7 | 7.3 | 125 | 2.0 |

TA = Terephthalic Acid
iPA = Isophthalic Acid
T = Tenacity (g/dtex)
E = Extension (%)
M = Initial Modulus (g/decitex)
IV = Inherent Viscosity

EXAMPLE 6 AND COMPARATIVE EXAMPLE B

A mixture of terephthalic acid (3 moles), hydrazine sulphate (2.99 moles) and 30% oleum (4872.3 parts) was stirred and heated in an oil bath to 135° C. during 1.5 hours. Stirring at 135° – 140° C. bath temperature was continued for 3.75 hours to give a viscous dope. Polymer isolated from the dope had an inherent viscosity of 3.3.

Iodine (catalyst 1.0 part) was added to the cold dope which was then stirred and heated to 90° – 95° C. Broa similar procedure to that given in Example 6 are listed in Table 3. The molar quantities of hydrazine sulphate used, for a total of 3 moles of terephthalic and isophthalic acids; and iodine and bromine usages are given for the preparation of the individual polyoxadiazoles. Table 3 also gives the properties of hot drawn fibres obtained by spinning the dopes at the indicated temperatures and hot drawing the resultant fibres at the indicated temperatures and draw ratio. Spinning and hot drawing were carried out by similar methods to those described in Example 2.

TABLE 3

| Example | Brominated Polyoxadiazole Composition TA/iPA (mole) % | Polymer Preparation: Usage of HS (moles) | I₂(g) | Br₂(g) | Polymer Analysis IV | % Br | Spinning Temp ° C. | Hot Drawing Temp ° C. | Max. Draw Ratio | Hot Drawn Fibre Properties T | E | M | IV |
|---|---|---|---|---|---|---|---|---|---|---|---|---|---|
| 7 | 98/2 | 2.99 | 1.0 | 174.7 | 2.9 | 22.0 | 190 | 520 | 6 | 6.6 | 5.8 | 260 | 2.0 |
| 8 | 95/5 | 2.99 | 1.0 | 174.7 | 2.5 | 21.6 | 190 | 512 | 7 | 6.9 | 3.6 | 280 | 2.2 |
| 9 | 90/10 | 2.997 | 0.75 | 159.1 | 2.3 | 21.3 | 192 | 495 | 7 | 7.0 | 4.0 | 255 | 2.2 |
| 10 | 80/20 | 3.0 | 0.75 | 152.9 | 2.5 | 21.9 | 190 | 455 | 10 | 9.3 | 5.4 | 265 | 2.2 |
| 11 | 70/30 | 3.006 | 1.0 | 137.3 | 2.8 | 20.1 | 170 | 455 | 16 | 8.6 | 7.5 | 325 | 2.5 |
| 12 | 60/40 | 3.015 | 0.75 | 109.9 | 2.5 | 16.4 | 178 | 430 | 16 | 6.7 | 6.5 | 220 | 2.2 |
| 13 | 60/40 | 3.018 | 0.75 | 137.3 | 2.7 | 20.8 | 190 | 420 | 14 | 7.5 | 7.6 | 250 | 2.4 |
| 14 | 40/60 | 3.036 | 0.75 | 68.6 | 2.7 | 10.9 | 187 | 445 | 16 | 6.8 | 11.0 | 150 | 2.4 |
| 15 | 30/70 | 3.036 | 0.5 | 68.6 | 2.6 | 10.7 | 176 | 460 | 20 | 7.0 | 9.0 | 128 | 2.3 |

TA = Terephthalic acid
iPA = Isophthalic acid
HS = Hydrazine sulphate
IV = Inherent Viscosity
T = Tenacity (g/decitex)
E = Extension (%)
M = Initial Modulus (g/decitex)

mine (187.2 parts) was added, at such a rate that little or no bromine refluxed from the reflux condenser, at 90° – 95° C. with stirring. Agitation at this temperature was continued until only a small amount of unreacted bromine remained and after cooling to ambient temperature the free bromine was blown off with dry nitrogen. Polymer isolated from the dope contained 20.5% bromine and had an inherent viscosity of 2.7. The polymer solutions were degased, dry jet wet spun, washed and dried as described in Example 2 with the exception of spinning temperature which was 148° C. for the

EXAMPLE 16

Terephthalic acid (2.7 moles) wad dissolved in 35% oleum (3414 parts) at 90° C. in a flask protected from atmospheric moisture. Iodine (catalyst; 0.75 part) was added and then bromine (159.1 parts) was added gradually (at such a rate that little or no bromine refluxed from the reflux condenser) during 12 hours whilst stirring at 90° – 95° C. Agitation at 90° –95° C. was continued until most of the bromine had reacted (approximately 4 hours). The bromination mixture was allowed to cool to ambient temperature and any residual free bromine which remained was blown off with dry nitrogen. Isophthalic acid (0.3 mole) and hydrazine sulphate (3.12 moles) were added to the suspension of brominated terephthalic acid in oleum at ambient temperature and the mixture was stirred and heated to 130° – 135° C. in 1.5 hours. Agitation was continued at approximately 135° C. for 3 hours and then 21.4% oleum (1442 parts) was added in a fine stream during the next 1 hour. Agitation was continued at about 135° C. for a further 1.5 hours to give a viscous dope. Polymer isolated from the dope was found to contain 22% bromine and had an inherent viscosity of 1.86. The solution was degassed, dry jet wet spun, washed and dried as described in Example 2 with the exception of spinning temperature which was 90° C. Drawing conditions were the same as Example 2 with the exception of hot plate temperature and maximum draw ratio which were 480° C. and 8x respectively.

The drawn fibre produced had the following properties:

| | |
|---|---|
| Tenacity (g/decitex) | 10.0 |
| Extension (%) | 4.4 |
| Initial Modulus (g/decitex) | 300 |
| Inherent Viscosity | 1.7 |

Table 4 lists other polyoxadiazole dopes which were prepared by a similar method to that described in Example 16. The usage of iodine catalyst and bromine in the bromination of the terephthalic acid component prior to addition of isophthalic acid and hydrazine sulphate and polymerisation are given. The Table also gives the properties of drawn fibres obtained by spinning the dopes and hot drawing the fibre at the indicated temperatures and draw ratio, spinning and hot drawing being carried out by similar procedures to that described in Example 2.

The dope was degassed and spun at 193° C. by a similar method to that described in Example 2. The fibre was drawn at 510° C., at a draw ratio of 6 to give yarn with properties:

| | |
|---|---|
| Tenacity (g/decitex) | 6.4 |
| Extension (%) | 9.4 |
| Initial Modulus (g/decitex) | 211 |

EXAMPLE 24 AND COMPARATIVE EXAMPLE C

These examples illustrate the advantage of a heat treatment immediately prior to drawing if the filament has not been dried or dried properly and still contains moisture.

A brominated polyoxadiazole copolymer of 2.2IV made from 80 parts terephthalic acid and 20 parts isophlatic acid with 17% bromine on the para-phenylene radicals, is dry jet wet spun from a 7.5% concentration solution in oleum into a cold aqueous coagulation bath with spin stretch factor 1 and subsequently washed free of acid, dried at constant length and oiled to give a 10 filament yarn at 550 dtex.

The dried spun yarn is fed to a cold pretension roll and then with a 1.09 prestretch ratio onto a feed roll with separator at ambient temperature. The draw yarn is collected after 12 turns on the draw roll and separator by a tension controlled wind up. The diameter of the feed and draw roll is 10 cm and the feedspeed is maintained constant at 10 m/min. The optimum hot plate temperature was found to be 495° C. for this yarn.

The same drawing process is applied to the spun yarn used for Example C with the exception that the feed roll is heated to 250° C. No major dimensional changes are apparent as the yarn touches the hot plate and the drawing of the yarn is stable. Moreover microscopic examination of the drawn filaments show them to be transparent and free of voiding.

Example C:-

TABLE 4

| Example | Brominated Polyoxadiazole Composition TA/iPA (mole) % | Brominating Intermediates | | Polymer Analysis | | Spinning Temp ° C. | Hot Drawing | | Hot Drawn Fibre Properties | | | |
|---|---|---|---|---|---|---|---|---|---|---|---|---|
| | | Iodine (g) | Bromine (g) | IV | % Br | | Temp ° C. | Maximum Draw Ratio | T | E | M | IV |
| 17 | 50/50 | 0.5 | 68.6 | 2.7 | 11.7 | 187 | 440 | 17 | 7.0 | 7.9 | 200 | 2.3 |
| 18 | 60/40 | 0.75 | 102.9 | 2.6 | 16.9 | 155 | 450 | 14 | 7.5 | 6.5 | 210 | 2.3 |
| 19 | 70/30 | 1.0 | 137.3 | 1.9 | 19.6 | 120 | 450 | 16 | 7.2 | 4.3 | 240 | 1.9 |
| 20 | 80/20 | 0.75 | 152.8 | 2.5 | 21.9 | 190 | 455 | 10 | 9.3 | 5.4 | 265 | 2.2 |
| 21 | 80/20 | 0.75 | 116.7 | 2.3 | 17.3 | 180 | 495 | 12 | 9.2 | 4.5 | 360 | 2.3 |
| 22 | 95/5 | 1.0 | 174.7 | 1.8 | 23.2 | 92 | 518 | 9 | 8.6 | 3.2 | 365 | 1.6 |

TA = Terephthalic Acid
iPA = Isophthalic Acid
IV = Inherent Viscosity
T = Tenacity (g/decitex)
E = Extension (%)
M = Initial Modulus (g/decitex)

EXAMPLE 23

A polyoxadiazole dope was prepared from 2-bromo terephthalic acid (183.75 parts) and hydrazine sulphate (101.6 parts) in oleum (794.5 parts, initial strength 30%) by a similar procedure to that used in Example 3, dilution during the polymerisation process being effected by the addition of 24% oleum (360 parts). A viscous pale brown dope was obtained. Polymer isolated from the dope had an inherent viscosity of 2.4 and contained 32.8% bromine.

Using a cold feed roll the spun yarn exhibits sudden dimensional changes with the filaments swelling and flaring away from the hot plate surface and each other. This gives poor drawing process stability and frequent breaks throughout the range of draw ratios. Furthermore microscopic examinaton of the drawn filaments produced particularly up to draw 7 x are opaque voided networks which fibrillate easily.

EXAMPLE 25

This example demonstrates the desirable preheating temperature range prior to hot drawing of a filament containing moisture.

A similar brominated polyoxadiazole copolymer to Example 24 but with IV 1.7 and made from 90 parts terephthalic acid and 10 parts isophthalic acid with 22% bromine on the para-phenylene radicals is converted to spun yarn as described in Example 1.

The spun yarn was drawn 8 times by the process described in Example 1 over a range of hot roll temperatures from 150° C. to 325° C. Samples of the yarn were collected just after the hot roll and after contact with the hot plate and examined under a microscope. No bubbles were seen in samples from the hot roll up to a temperature of 270° C. but with a rapid increase in size and frequently up to 325° C. The samples from the hot plate showed an increase in bubbles on samples pretreated at 190° C. or lower but no change in those preheated at higher temperatures. Thus pretreatments in the range 190° C. – 270° C. showed no "foaming" during drawing. Observation of the drawing process stability also indicated that the most desirable pretreatment was in this temperature range.

MEASUREMENT OF TENSILE PROPERTIES

Decitex was determined by weighing 25 cm lengths of the yarn on a torsion balance. The breaking load, extension and load at 1% extension were measured over a 10 cm length of the decitex samples at an extension rate of 10% per minute using an Instron 3B with pneumatic action jaws (catalogue ref. 2712/002) rubber coated.

We claim:

1. A method for the production of a drawn filament of poly-phenylene-1,3,4-oxadiazole having as characteristic units

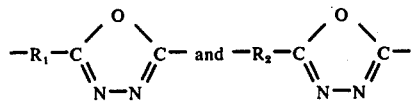

in which
   $R_1$ is a p-phenylene radical and
   $R_2$ is a m-phenylene radical,
the ratio of $R_1$ radicals to $R_2$ radicals being in the range 100/0 to 10/90, and at least some of the $R_1$ and/or $R_2$ radicals being bromine substituted in a position ortho to the heterocyclic ring, which comprises:
   1. extruding a solution of the polymer in oleum or sulphuric acid into a stream by forcing the solution through a shaped orifice into a gaseous medium,
   2. directing the stream for a short distance through the gaseous medium and into an aqueous coagulant for forming the filament of the polymer;
   3. withdrawing the thus-formed filament from the aqueous coagulant,
   4. passing the filament through a washing stage,
   5. drying the filament,
   6. and drawing the filament at least 6 times its length while heating it to a temperature of at least 350° C.

2. A method according to claim 2, wherein the filament is drawn at a temperature of at least 400° C.

3. A method according to claim 1, wherein the filament is dried immediately prior to drawing by being heated at a temperature in the range 140° C to 300° C.

4. A method for the production of a drawn filament of poly-phenylene-1,3,4-oxadiazole having as characteristic units

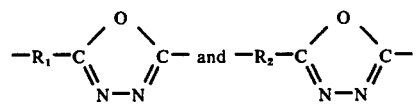

in which
   $R_1$ is a p-phenylene radical and
   $R_2$ is m-phenylene radical,
the ratio of $R_1$ radicals to $R_2$ radicals being in the range 95/5 to 70/30, and at least some of the $R_2$ and/or $R_2$ radicals being bromine substituted in a position ortho to the oxadiazole ring, which comprises:
   1. extruding a heated solution of the polymer in oleum or sulphuric acid in a downward direction into a stream by forcing the solution through a shaped orifice into a gaseous medium comprising air,
   2. directing the stream through the air for a short distance and into an aqueous coagulating bath,
   3. withdrawing the thus-formed filament from the aqueous coagulating bath,
   4. washing the filament with water,
   5. drying the filament,
   6. and drawing the filament while heated to a temperature of at least 400° C at a draw ratio of at least 6:1.

5. A method according to claim 4, wherein the filament is stretched in the coagulating bath.

6. A method according to claim 5, wherein the filament is stretched after its withdrawal from the coagulation bath and prior to drying.

7. A method according to claim 5, wherein the filament is dried immediately prior to drawing by being heated at a temperature in the range 210° C to 270° C.

8. A method according to claim 5, wherein the bromine content of the polymer is at least 15% by weight.

9. A method according to claim 5, wherein the coagulating bath comprises water

10. A method according to claim 5, wherein the coagulating bath comprises aqueous sulphuric acid.

* * * * *